United States Patent [19]

Mignani et al.

[11] Patent Number: 5,021,371
[45] Date of Patent: Jun. 4, 1991

[54] LOW CARBON/HIGH PURITY BORON NITRIDE

[75] Inventors: Gerard Mignani, Lyons; Pierre Ardaud, Ste-Foy-les-Lyon; Roger Trichon, Villeurbanne, all of

[73] Assignee: Rhone-Poulenc Chimie, Courbevoie, France

[21] Appl. No.: 482,073

[22] Filed: Feb. 20, 1990

[30] Foreign Application Priority Data

Feb. 20, 1989 [FR] France ................. 89 02169

[51] Int. Cl.$^5$ .................. C03C 3/14; C04B 35/51; C04B 35/56; C04B 35/58
[52] U.S. Cl. ................................. 501/96; 501/49; 501/92; 423/276; 423/290; 423/292; 423/298
[58] Field of Search .............. 501/96, 88, 92, 95, 501/49; 423/279, 291, 290, 298, 447.3, 276, 447.1; 427/255.2; 252/500

[56] References Cited

U.S. PATENT DOCUMENTS 4,054,708 10/1977 Robba et al. ................. 423/291
4,578,283 3/1986 Kirtley et al. ................. 252/500
4,581,468 4/1986 Paciorek et al. .
4,707,556 11/1987 Paciorek et al. .
4,801,439 11/1989 Blum et al. ................... 423/279
4,810,436 3/1989 Johnson ........................ 501/96

FOREIGN PATENT DOCUMENTS 8802003 3/1988 PCT Int'l Appl. .
2163761 3/1986 United Kingdom .

Primary Examiner—William R. Dixon, Jr.
Assistant Examiner—Michael A. Marcheschi
Attorney, Agent, or Firm—Burns, Doane, Swecker & Mathis

[57] ABSTRACT

Highly pure boron nitride ceramic material, devoid of silicon values and having low carbon content, is prepared by pyrolyzing, under an atmosphere of ammonia, the product of the reaction between (i) at least one B-trihalogeno-borazole having the formula:

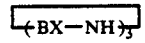

and (ii) at least one primary amine having the formula:

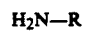

in which formulae X is a halogen atom and R is an optionally substituted hydrocarbon radical having from 1 to 6 carbon atoms.

14 Claims, No Drawings

LOW CARBON/HIGH PURITY BORON NITRIDE

BACKGROUND OF THE INVENTION

1. Field of the Invention

The present invention relates to a novel process for the preparation of boron nitride.

2. Description of the Prior Art

Boron nitride is a known material that is increasingly in demand, in particular because of its stability at high temperatures, its resistance to thermal shock, its great chemical inertness and its very good heat conductivity. On the other hand, its low electrical conductivity makes it an insulator of choice.

Various processes for preparing boron nitride are presently known to this art.

One such process entails reacting boron trichloride with ammonia in the gaseous phase. A fine powder of boron nitride is thus obtained which can be sintered to produce solid shaped articles.

More recently, it has been discovered that it was also possible to prepare boron nitride by pyrolysis of polymer precursors.

One advantage of this polymer route resides especially in the possibility of shaping this type of product and, more particularly, for producing, after pyrolysis, fibers or films of boron nitride.

Thus, in U.S. Pat. No. 4,581,468 an organoboron polymer is described which is prepared by reacting ammonia (ammonolysis) with a trichlorotrialkylsilylborazole (cyclic compound) and which, after spinning and pyrolysis at a temperature of 970° C., is converted into boron nitride fibers.

However, the cyclic starting compound described in the '468 patent is very difficult to prepare and thus is quite costly. Accordingly, such process is not applicable on an industrial scale.

On the other hand, the maximum yield by weight of boron nitride that can be produced from this type of product does not exceed 22%, which indicates, a priori, actual yields well below this value.

Finally, the ceramic material obtained after pyrolysis contains significant amounts of silicon because of the nature of the precursor itself.

SUMMARY OF THE INVENTION

Accordingly, a major object of the present invention is the provision of a simple, efficient, economical and readily carried out improved process for the production of high purity ceramic materials based on boron nitride, in particular essentially devoid of silicon values and, in addition, having a very low carbon content, in particular a content of less than 0.4% by weight, in a wide variety of useful forms (powders, filaments, fibers, molded shaped articles, coatings, layers, foils, films, and the like), as well as in high yields by weight.

Briefly, the present invention features a process for the preparation of boron nitride, comprising pyrolyzing, under an atmosphere of ammonia, the product of the reaction between (i) at least one B-trihalogenoborazole having the formula:

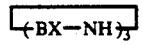

and (ii) at least one primary amine having the formula:

$$H_2N-R$$

in which formulae X is a halogen atom and R is an optionally substituted hydrocarbon radical having from 1 to 6 carbon atoms, inclusive.

DETAILED DESCRIPTION OF THE PREFERRED EMBODIMENTS OF THE INVENTION

More particularly according to the present invention, not only can ceramic materials based on boron nitride thus be produced that are free of silicon, but is has now unexpectedly and surprisingly also been demonstrated that such improved ceramics are produced in higher yields by weight and have particularly low contents of residual carbon, such carbon impurity generally being regarded as deleterious to the quality of final products made of boron nitride.

Moreover, another advantage of the process of the invention is that the starting compounds are commercially available and/or are simple to prepare industrially. Thus, the starting materials are inexpensive, rendering the process of the invention particularly economical.

The preferred starting B-trihalogenoborazole (cyclic compound) is B-trichloroborazole, although any other B-trihalogenoborazole can also be used, such as, for example, a B-trifluoro-, a B-tribromo- or a B-triiodoborazole.

Exemplary starting primary amines are those in which the hydrocarbon radicals R defined above are alkyl, cycloalkyl, aryl, alkenyl and alkynyl radicals.

Representative such alkyl radicals include the methyl, ethyl, propyl, butyl, n-butyl, pentyl and hexyl radicals. Exemplary cycloalkyl radicals include the cyclopentyl and cyclohexyl radicals, and an exemplary aryl radical is the phenyl radical.

Particularly representative alkenyl radicals are the vinyl, allyl, butenyl and pentenyl radicals.

Finally, particularly representative alkynyl radicals are the ethynyl, propynyl and butynyl radicals.

In a preferred embodiment of the invention, the process is carried out using primary amines in which the hydrocarbon radicals R are saturated, and even more preferably are alkyl radicals.

In another preferred embodiment of the invention, the hydrocarbon radicals R are $C_1$-$C_4$ radicals.

The general scheme of the aminolysis reactions in the reaction mixture is as follows:

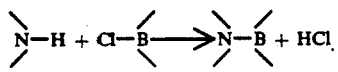

The aminolysis reaction can be carried out in bulk or, preferably, in an organic solvent medium (hexane, pentane, toluene, etc.) and under anhydrous conditions.

In general, the reaction is carried out under atmospheric pressure, although lower or higher pressures are, of course, not excluded.

The temperature at which the reaction is carried out is not critical and can range, in particular, from −80° C. to the reflux temperature of the solvent used.

However, as the aminolysis reactions are typically fairly exothermic, it is preferred to conduct the reaction at low temperatures, namely, at temperatures lower than 50° C.

In this latter case, it can be advantageous, in order to bring the reaction to completion and/or to produce a better structure of the final polymer, either to permit the reaction mixture to mature (age) for a certain period of time, e.g., by allowing it to gradually return to ambient temperature, preferably under mechanical stirring, or to heat the reaction mixture, for example to the reflux temperature of the solvent, and to carry out such operation for a period of time which can range from a few minutes to several hours.

The reaction time, depending on the amounts of reactant used, can then vary from several minutes to several hours.

The reaction yields are on the order of 80% by weight.

The amounts of the reactants used in the process of the invention must correspond at minimum to the stoichiometry of the aminolysis reaction, the general reaction scheme of which has been given above, i.e., at least 3 moles of primary amine must be used per 2 moles of B-trihalogenoborazole.

However, in light of the fact that the aminolysis reaction generates hydrogen halides (for example HCl) in the reaction mixture and that it proves desirable to neutralize said halides in situ, it is preferred to use an amount of the primary amine that is in excess of the stoichiometric amount, such excess advantageously corresponding to the use of at least 6 moles of primary amine per 2 moles of B-trihalogenoborazole.

Of course, in lieu of using an amount in excess of the stoichiometric amount, it is also possible to effect the neutralization of the hydrogen halides in an equivalent manner, by adding an effective amount of neutralizing agents, in particular of the tertiary amine and/or pyridine type, to the reaction mixture.

Upon completion of this reaction step, the polymer is separated from the reaction mixture and in particular from the amine hydrochloride formed. This is carried out by any known means, for example by filtration, or by extraction and decanting using, in particular, liquid ammonia.

In another preferred embodiment of the invention, precursors in solution, products of separate aminolysis reactions with different starting primary amines, are mixed in proportions such as to provide precursors having intermediate properties. This mixture is then subjected to the same steps as one given precursor. The proportions of the precursors in solution are selected to provide a compromise between the highest yield among the pyrolysis yields of the precursors in the mixture and the highest solubility and fusibility of all those of the precursors in the mixture. The starting primary amines are preferably propylamine and methylamine, and more particularly with a weight ratio of the products of the aminolysis reaction of propylamine to the products of the aminolysis reaction of methylamine ranging from 0.6 to 1.5.

The polymer thus recovered, after removing the solvent, if required, and then drying, then constitutes the final reaction product.

If necessary, it is possible, in a subsequent step, to subject the polymer obtained to a heat treatment (thermolysis) with a view towards further improving its behavior under pyrolysis and thus the yield of boron nitride by weight. The effect of this thermolysis, which is generally carried out in bulk and at a temperature ranging from 100° C. to 200° C., and preferably under ammonia, is to modify the internal structure of the polymer, likely improving the crosslinking thereof, which could explain its improved thermal properties.

The polymers based on boron and nitrogen which are obtained according to the invention have a number-average molecular weight ($\overline{M}n$) advantageously ranging from 100 to 5,000 and preferably from 300 to 2,000.

On the other hand, they have a weight-average molecular weight ($\overline{M}w$) advantageously ranging from 100 to 5,000 and preferably from 400 to 2,000.

Depending on the conditions for carrying out the process described above ([primary amine]/[B-trihalogenoborazole] ratios, reaction temperatures, etc.), the polymers can be in a form ranging from highly viscous oil to a solid at ambient temperature.

With the exception of the polymers which have been subjected to a subsequent thermolysis step, the polymers are, on the other hand, fusible and soluble in the majority of typical organic solvents (hexane, toluene, etc.), which can be highly advantageous in respect of the downstream shaping thereof.

These polymers based on boron and nitrogen are particularly useful for the production of ceramic materials and shaped articles at least in part comprised of boron nitride.

According to this invention, and in the most general case (production of powders), the polymer is then pyrolyzed under an atmosphere of ammonia at a temperature which can progressively be increased from 100° to 2,000° C., such treatment being continued until the polymer has been completely converted into boron nitride.

In general, the complete conversion to boron nitride is attained at temperatures of from 800° to 1,100° C.; however, in order to further improve the crystallization of the ceramic, it may be necessary to continue heating to higher temperatures, in particular ranging from 1,500° to 2,000° C.

The polymer can also be shaped prior to pyrolysis, for example by film-forming, by molding or by spinning. If it is desired to produce fibers, the polymer is spun using a conventional die (if appropriate after melting, if the polymer is initially in the solid state) and is then subjected to a heat treatment under an atmosphere of ammonia at a temperature ranging from 100° to 2,000° C. to provide a boron nitride fiber.

If necessary, it is possible, before the heat treatment, to subject the fiber to a treatment intended to improve its thermal and/or mechanical properties, in particular a treatment under HCl.

The resulting fibers can then be used as a reinforcing structure for composite materials of the ceramic/ceramic, ceramic/metal or ceramic/plastic type.

In order to further illustrate the present invention and the advantages thereof, the following specific examples are given, it being understood that same are intended only as illustrative and in nowise limitative.

EXAMPLE 1

43.7 grams (0.43 mole) of triethylamine (TEA), 15 grams of mono-n-butylamine (0.205 mole) and 300 ml of toluene (solvent) were introduced into a 1-liter round-bottomed flask dried under nitrogen.

In a second round-bottomed flask, 17.1 grams of

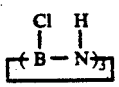

(0.093 mole) were dissolved in 400 ml of toluene. This solution was introduced into the first at ambient temperature over the course of 1 hour, 30 min; the temperature of the reaction mixture then increased from 25° to 35° C.

The mixture was permitted to stand, under stirring, for 4 hours at 20° C. and the precipitate of TEA hydrochloride was then filtered off under nitrogen.

After evaporating off the solvent, 14 grams of a viscous yellow oil were isolated.

The characteristics of the resulting polymer were as follows:

(i) residual chlorine content: 0.98% by weight;
(ii) TGA (under helium at 850° C.): 38.9%.

This polymer was then pyrolyzed at 1,000° C. under ammonia to produce a ceramic, which was identified by IR and RAMAN analyses as being boron nitride. The yield of pyrolysis was then 36.3% by weight.

Elementary analysis gave the following composition for the ceramic (the % are given by weight):

B=40.8%
N=57.8%
C<0.1%
H=0.5%
O=1.1%.

EXAMPLE 2

A solution of 10.7 g of

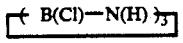

(0.058 mole) in 200 ml of toluene was prepared in a 250 ml round-bottomed flask dried under nitrogen.

18 g of monomethylamine (0.58 mole) at −10° C. and 250 ml of toluene were introduced into a 500 ml reactor dried under nitrogen.

The first solution was introduced into the second at a temperature ranging from −10° to 30° C. over the course of 45 minutes and the mixture was then permitted to stand, under stirring, for a period of 16 hours.

After filtration and evaporation, 5 g of a white, slightly sticky solid polymer were recovered.

The characteristics of the resulting polymer were as follows:

(i) Softening temperature: 50° C.;
(ii) $\overline{M}n=310$;
(iii) $\overline{M}w=450$;
(iv) TGA (under helium at 850°)=53.0%;
(v) Ip=1.44;
(vi) Proportion of residual chlorine=0.2% by weight.

This polymer was then pyrolyzed at 1,000° C. under ammonia to produce a ceramic which was identified by IR and RAMAN analyses as being boron nitride.

Yield from pyrolysis at 1,000° C.: 46.7% by weight;
Proportion of carbon in the ceramic: 0.18% by weight.

EXAMPLE 3

55 grams of B-trichloroborazole (0.3 mole) and 1,900 ml of toluene were introduced into a 3-liter three-necked reactor dried under nitrogen.

141 g of propylamine (2.3 moles) were then introduced over the course of 1 hour, during which time the temperature increased from 23° to 45° C.

The reaction mixture was then heated under reflux for 3 hours and then filtered under nitrogen.

A sample of the solution was evaporated to ascertain the titre of the solution and the characteristics of the precursor.

The remainder of the solution was designated solution A.

The reaction yield was 75.6% by weight. This product was soluble in toluene; it was gummy and stable at ambient temperature.

It had a melting point of 45° C.

The yield from the pyrolysis under ammonia at 1,000° C. was 33.6% by weight.

EXAMPLE 4

57.2 g of B-trichloroborazole (0.31 mole) and 2,100 ml of toluene were introduced into a 3-liter reactor dried under nitrogen.

77 g of methylamine (2.48 moles) were introduced over the course of 1 hour, 30 min, during which time the temperature of the reaction mixture increased from 25° to 50° C.

The reaction mixture was then heated under reflux for 3 hours and then filtered under nitrogen.

A sample of the solution was evaporated to ascertain the titre of the solution and the characteristics of the precursor.

The remainder of the solution was designated solution B.

The reaction yield was 64.3% by weight.

This product was sparingly soluble in toluene and had poor stability to heat (crosslinked on heating). At ambient temperature, this product was solid.

The yield from the pyrolysis under ammonia at 1,000° C. was 48.1% by weight.

EXAMPLE 5

The two solutions A and B obtained in Examples 3 and 4 were mixed in given proportions (calculated on the dry solids content) and the mixtures were then evaporated in order to ascertain the reciprocal influence of the 2 precursors on the characteristics of the mixture.

(a) Ratio A/B=51.3/48.7 by weight.

The precursor thus obtained was a transparent solid at ambient temperature and was liquid at 100° C.; its melting point was 70° C. It was partially soluble in toluene. The yield from the pyrolysis under ammonia of this mixture of precursors up to 1,000° C. was 39.67% by weight. (b) Ratio A/B=74.4/24.6 by weight.

The precursor thus obtained was a transparent solid at ambient temperature and was liquid at 100° C.; its melting point was 50° C. It was soluble in toluene.

The yield from the pyrolysis under ammonia of this mixture of precursors up to 1,000° C. was 35.2% by weight.

COMPARATIVE EXAMPLE 6

The synthesis was as described in Example 2; the starting reactants were methylamine and

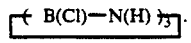

The precursor obtained was then subjected to two different treatments:

(A) Pyrolysis under ammonia

The precursor was heated from 30° C. to 200° C. under ammonia in order to improve its crosslinked character and then, after 4 hours, was heated from 200° C. to 1,000° C. under ammonia.

The yield of the pyrolysis was 48.9% by weight. The IR and RAMAN analyses enabled the ceramic to be identified as being boron nitride.

Elementary analyses gave the following composition for the said ceramic (the % are given by weight):
B=40.9%
N=55.5%
C=0.3%
H=0.5%
O=1.2%

(B) Pyrolysis under nitrogen

The same pyrolysis procedure as the pyrolysis under ammonia was carried out, but the ammonia was replaced by nitrogen.

The yield from the pyrolysis was 46.1% by weight. Elementary analysis gave the following composition for the ceramic (the % are given by weight):
B=40.1%
N=55.1%
C=2.1%
H=0.2%
O=1.6%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a boron nitride ceramic material, which comprises pyrolyzing an organoboron polymer under an atmosphere of ammonia, said organoboron polymer comprising the polymerizate between (i) at least one B-trihalogenoborazole having the formula:

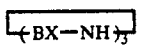

and (ii) at least one primary amine having the formula:

in which formulae X is a halogen atom and R is an optionally substituted hydrocarbon radical having from 1 to 6 carbon atoms.

2. The process as defined by claim 1, wherein said radical R is a saturated hydrocarbon radical.

3. The process as defined by claim 1, wherein said radical R is a $C_1$-$C_4$ hydrocarbon radical.

4. The process as defined by claim 2, wherein said radical R is an alkyl radical.

5. The process as defined by claim 1, wherein X is chlorine.

6. The process as defined by claim 1, the polymerization having been carried out in an organic solvent medium.

7. The process as defined by claim 1, the polymerization having been carried out in the presence of an amount of primary amine in excess of the stoichiometric amount.

8. The process as defined by claim 1, said polymerizate comprising admixture of different products of separate aminolysis reactions.

9. The process as defined by claim 8, said polymerizate comprising admixture of a product of the aminolysis of propylamine and a product of the aminolysis of methylamine.

10. The process as defined by claim 9, wherein the ratio by weight of the product of the aminolysis of propylamine to the product of the aminolysis of methylamine ranges from 0.6 to 1.5.

11. The process as defined by claim 1, said polymerizate comprising a shaped article.

12. The process as defined by claim 11, said shaped article comprising a fiber or film.

13. A process for the production of a boron nitride ceramic material, which process comprises pyrolyzing an organoboron polymer under an atmosphere of ammonia, said organoboron polymer comprising the aminolysis reaction product between (i) at least one B-trihalogenoborazole having the formula:

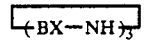

and (ii) at least one primary amine having the formula

in which formulae X is a halogen atom and R is an optionally substituted hydrocarbon radical having from 1 to 6 carbon atoms.

14. A process according to claim 1, said organoboron nitride ceramic material having a carbon content of less than 0.4 wt. %.

* * * * *